United States Patent
Lee et al.

(10) Patent No.: US 10,865,260 B2
(45) Date of Patent: Dec. 15, 2020

(54) SUPPORTED HYBRID CATALYST

(71) Applicant: LG Chem, Ltd., Seoul (KR)

(72) Inventors: Jin Young Lee, Daejeon (KR); Sung Ho Park, Daejeon (KR); Heon Yong Kwon, Daejeon (KR); Hyun Jee Kwon, Daejeon (KR); Sol Cho, Daejeon (KR); Oh Joo Kwon, Daejeon (KR); Ki Soo Lee, Daejeon (KR); Dae Sik Hong, Daejeon (KR)

(73) Assignee: LG Chem, Ltd.

( * ) Notice: Subject to any disclaimer, the term of this patent is extended or adjusted under 35 U.S.C. 154(b) by 144 days.

(21) Appl. No.: 16/090,763

(22) PCT Filed: Jan. 25, 2018

(86) PCT No.: PCT/KR2018/001125
§ 371 (c)(1),
(2) Date: Oct. 2, 2018

(87) PCT Pub. No.: WO2018/139874
PCT Pub. Date: Aug. 2, 2018

(65) Prior Publication Data
US 2020/0010589 A1   Jan. 9, 2020

(30) Foreign Application Priority Data

Jan. 25, 2017 (KR) .................. 10-2017-0012228
Jan. 24, 2018 (KR) .................. 10-2018-0009005

(51) Int. Cl.
*C08F 210/16* (2006.01)

(52) U.S. Cl.
CPC ........ *C08F 210/16* (2013.01); *C08F 2420/01* (2013.01)

(58) Field of Classification Search
CPC .......................... C08F 210/16; C08F 2420/01
USPC .......................................................... 526/116
See application file for complete search history.

(56) References Cited

U.S. PATENT DOCUMENTS

| | | | |
|---|---|---|---|
| 5,032,562 A | 7/1991 | Lo et al. | |
| 5,525,678 A | 6/1996 | Mink et al. | |
| 5,914,289 A | 6/1999 | Razavi | |
| 6,153,549 A | 11/2000 | Hubscher et al. | |
| 2007/0155919 A1 | 7/2007 | Okumura et al. | |
| 2011/0319575 A1 | 12/2011 | Jensen et al. | |
| 2012/0010375 A1 | 1/2012 | Yang et al. | |
| 2013/0261265 A1 | 10/2013 | Karjala et al. | |
| 2014/0194277 A1 | 7/2014 | Ishihama et al. | |
| 2015/0119537 A1 | 4/2015 | Holtcamp et al. | |
| 2016/0280813 A1 | 9/2016 | Kwon et al. | |
| 2017/0320978 A1* | 11/2017 | Jeong ................... | C08F 210/16 |

FOREIGN PATENT DOCUMENTS

| | | |
|---|---|---|
| CN | 1181386 A | 5/1998 |
| CN | 1890272 A | 1/2007 |
| CN | 102958948 A | 3/2013 |
| CN | 103347907 A | 10/2013 |
| CN | 103582669 A | 2/2014 |
| CN | 106062012 A | 10/2016 |
| JP | 2011089019 A | 5/2011 |
| JP | 5487089 B2 | 5/2014 |
| JP | 2016145190 A | 8/2016 |
| KR | 19980033355 A | 7/1998 |
| KR | 20130140110 A | 12/2013 |
| KR | 20160069467 A | 6/2016 |
| KR | 20160076415 A | 6/2016 |
| KR | 20160084181 A | 7/2016 |
| WO | 2010144784 A1 | 12/2010 |
| WO | 2016093549 A2 | 6/2016 |
| WO | 2016195824 A1 | 12/2016 |

OTHER PUBLICATIONS

International Search Report for Application No. PCT/KR2018/001125, dated May 4, 2018.
Chinese Search Report for Application No. 2018800015893 dated Aug. 3, 2020, 3 pages.
Taubmann, at al., "Catalytic dehydrogenation of cyclooctane with titanium, zirconium, and hafnium metallocene complexes," Journal of Organometallic Chemistry, Jun. 1, 2009, pp. 2005-2019, vol. 694, No. 13.

* cited by examiner

*Primary Examiner* — William K Cheung
(74) *Attorney, Agent, or Firm* — Lerner, David, Littenberg, Krumholz & Mentlik, LLP

(57) ABSTRACT

The present disclosure provides a supported hybrid catalyst which facilitates the preparation of polyolefins having improved bubble stability and exhibiting excellent processability for a blown film while maintaining high transparent haze and improved melt strength, and a method for preparing the same.

11 Claims, No Drawings

SUPPORTED HYBRID CATALYST

CROSS-REFERENCE TO RELATED APPLICATIONS

This application is a national phase entry under 35 U.S.C. § 371 of International Application No. PCT/KR2018/001125, filed Jan. 25, 2018, which claims priority to Korean Patent Application No. 10-2017-0012228, filed Jan. 25, 2017 and Korean Patent Application No. 10-2018-0009005, filed Jan. 24, 2018, the disclosures of which are incorporated herein by reference.

TECHNICAL FIELD

The present disclosure relates to a supported hybrid catalyst capable of facilitating the preparation of polyolefins having excellent processability for a blown film.

BACKGROUND OF THE INVENTION

Olefin polymerization catalyst systems may be divided into Ziegler-Natta and metallocene catalysts, and these highly active catalyst systems have been developed in accordance with their characteristics. Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties.

Meanwhile, the metallocene catalyst includes a main catalyst having a transition metal compound as a main component and an organometallic compound cocatalyst having aluminum as a main component. Such a catalyst is a single-site catalyst which is a homogeneous complex catalyst, and offers a polymer having a narrow molecular weight distribution and a uniform compositional distribution of comonomers, due to the single site characteristics. The stereoregularity, copolymerization characteristics, molecular weight, crystallinity, etc. of the resulting polymer may be controlled by changing a ligand structure of the catalyst and polymerization conditions.

U.S. Pat. No. 5,032,562 discloses a method for preparing a polymerization catalyst by supporting two different transition metal catalysts on one support. This catalyst is prepared by supporting a titanium (Ti)-based Ziegler-Natta catalyst which produces a high molecular weight polymer and a zirconium (Zr)-based metallocene catalyst which produces a low molecular weight polymer on one support, and results in a bimodal molecular weight distribution. This catalyst is disadvantageous in that the supporting procedure is complicated and morphology of polymers is poor due to a cocatalyst.

U.S. Pat. No. 5,525,678 discloses a method for using a catalyst system for olefin polymerization, in which a metallocene compound and a non-metallocene compound are simultaneously supported on a support to realize simultaneous polymerization of a high molecular weight polymer and a low molecular weight polymer. However, there are disadvantages that the metallocene compound and non-metallocene compound must be separately supported and the support must be pretreated with various compounds for supporting.

U.S. Pat. No. 5,914,289 discloses a method for controlling a molecular weight and a molecular weight distribution of polymers using metallocene catalysts which are respectively supported on supports. However, a large amount of solvent and a long period of time are required to prepare the supported catalysts, and a process of supporting metallocene catalysts on the respective supports is troublesome.

Also, a linear low density polyethylene (LLDPE) is produced by copolymerizing ethylene and an alpha olefin using a polymerization catalyst under low pressure. Thus, this is a resin having a narrow molecular weight distribution and a certain length of a short chain branch (SCB), without a long chain branch (LCB). The LLDPE film has high strength at break and elongation in addition to the properties of a general polyethylene, and exhibits excellent tear strength, falling weight impact strength, or the like. This has led to an increase in the use of a stretch film, an overlapping film, or the like which is difficult to apply an existing low density polyethylene or high density polyethylene. However, LLDPE has poor processability for a blown film compared to excellent mechanical properties. A blown film is a film produced by a method of blowing air into molten plastic and inflating it, and is also called an inflation film.

As factors to be taken into consideration when processing a blown film, bubble stability, processing load, or the like must be considered, and especially, the bubble stability should be considered important. The bubble stability means a property that, when the film is produced by injecting air into the molten plastic, the produced film maintains its shape without being torn, which is associated with melt strength (MS).

The melt strength refers to a strength for maintaining a shape capable of withstanding the molding and processing in a softened and melted state. The melt strength of low density polyethylene (LDPE) is higher than that of LLDPE. This is because, in the case of LDPE, branched chains are entangled with each other as compared to LLDPE, which is more advantageous in withstanding the molding and processing. Therefore, in order to complement the melt strength of LLDPE, a method of producing a film by blending LDPE has been proposed. However, this method has a problem of significantly reducing the mechanical properties of conventional LLDPE even when a very small amount of LDPE is added.

On the other hand, a metallocene catalyst capable of preparing a polyolefin having long chain branches at low pressure has been developed. The prepared polyolefin contains a very small amount of long chain branches as compared with LDPE, but has improved processability (bubble stability) as compared with conventional LLDPE, and exhibits excellent mechanical properties as compared with LDPE. However, the bubble stability of the polymer was insufficient to produce a blown film using this polymer alone, and further improvement was required.

Therefore, to solve the above problems, there is a need to develop a metallocene catalyst capable of preparing polyolefins having improved bubble stability and exhibiting excellent processability for a blown film while maintaining high transparent haze and improved melt strength.

DETAILS OF THE INVENTION

Objects of the Invention

The present disclosure is to provide a supported hybrid catalyst which facilitates the preparation of polyolefins exhibiting excellent processability for a blown film while maintaining high transparent haze and improved melt strength, and a method for preparing the same.

In addition, the present disclosure is to provide a polyolefin prepared using the supported hybrid catalyst.

Means for Achieving the Object

According to an embodiment of the present disclosure, a supported hybrid catalyst, including at least one first transition metal compound selected from compounds represented by the following Chemical Formula 1; at least one second transition metal compound selected from compounds represented by the following Chemical Formula 2; and a support on which the first and the second transition metal compounds are supported, is provided.

[Chemical Formula 1]

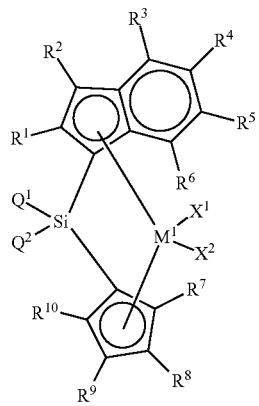

In Chemical Formula 1, $M_1$ is a Group 4 transition metal;

$X^1$ and $X^2$ are the same as or different from each other, and are each independently any one of a halogen, a nitro group, an amido group, a phosphine group, a phosphide group, a C1 to C30 hydrocarbyl group, a C1 to C30 hydrocarbyloxy group, a C2 to C30 hydrocarbyloxyhydrocarbyl group, —$SiH_3$, a C1 to C30 hydrocarbyl(oxy)silyl group, a C1 to C30 sulfonate group, and a C1 to C30 sulfone group;

$R^1$ and $R^3$ to $R^{10}$ are the same as or different from each other, and are each independently selected from the group consisting of hydrogen, a C1 to C30 hydrocarbyl group, a C1 to C30 hydrocarbyloxy group, and a C2 to C30 hydrocarbyloxyhydrocarbyl group;

$R^2$ is selected from the group consisting of a C1 to C30 hydrocarbyl group, a C1 to C30 hydrocarbyloxy group, and a C2 to C30 hydrocarbyloxyhydrocarbyl group;

$Q^1$ and $Q^2$ are the same as or different from each other, and are each independently any one of hydrogen, a C1 to C30 hydrocarbyl group, a C1 to C30 hydrocarbyloxy group, a C2 to C30 hydrocarbyloxyhydrocarbyl group, —$SiH_3$, a C1 to C30 hydrocarbyl(oxy)silyl group, a C1 to C30 hydrocarbyl group substituted with a halogen, and —$NR_aR_b$; and $R_a$ and $R_b$ are the same as or different from each other, and are each independently any one of hydrogen and a C1 to C30 hydrocarbyl group, or may be connected with each other to form an aliphatic or aromatic ring.

[Chemical Formula 2]

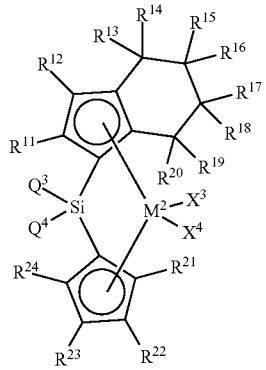

In Chemical Formula 2, $M^2$ is a Group 4 transition metal;

$X^3$ and $X^4$ are the same as or different from each other, and are each independently any one of a halogen, a nitro group, an amido group, a phosphine group, a phosphide group, a C1 to C30 hydrocarbyl group, a C1 to C30 hydrocarbyloxy group, a C2 to C30 hydrocarbyloxyhydrocarbyl group, —$SiH_3$, a C1 to C30 hydrocarbyl(oxy)silyl group, a C1 to C30 sulfonate group, and a C1 to C30 sulfone group;

$R^{11}$ to $R^{24}$ are the same as or different from each other, and are each independently selected from the group consisting of hydrogen, a C1 to C30 hydrocarbyl group, a C1 to C30 hydrocarbyloxy group, and a C2 to C30 hydrocarbyloxyhydrocarbyl group;

$Q^3$ and $Q^4$ are the same as or different from each other, and are each independently any one of hydrogen, a C1 to C30 hydrocarbyl group, a C1 to C30 hydrocarbyloxy group, a C2 to C30 hydrocarbyloxyhydrocarbyl group, —$SiH_3$, a C1 to C30 hydrocarbyl(oxy)silyl group, a C1 to C30 hydrocarbyl group substituted with halogen, and —$NR_{a'}R_{b'}$; and $R_{a'}$ and $R_{b'}$ are the same as or different from each other, and are each independently any one of hydrogen and a C1 to C30 hydrocarbyl group, or may be connected with each other to form an aliphatic or aromatic ring.

For example, in the first transition metal compound of Chemical Formula 1, $R^1$ and $R^3$ to $R^6$ may be hydrogen, and $R^2$ may be any one of a C1 to C20 alkyl group, a C1 to C20 alkoxy group, a C2 to C20 alkenyl group, a C6 to C20 aryl group, a C7 to C20 arylalkyl group, and a C7 to C20 alkylaryl group.

More specifically, in the first transition metal compound of Chemical Formula 1, $M^1$ may be Ti, Zr, or Hf; $X^1$ and $X^2$ are the same as or different from each other, and may each independently be any one of a halogen, a C1 to C20 alkyl group, and a C1 to C20 alkoxy group; $R^1$ and $R^3$ to $R^6$ may be hydrogen; $R^2$ may be a C1 to C20 alkyl group or a C6 to C20 aryl group; $R^7$ to $R^{10}$ are the same as or different from each other, and may each independently be any one of a C1 to C20 alkyl group, a C1 to C20 alkoxy group, and a C2 to C20 alkenyl group; and $Q^1$ and $Q^2$ may each independently be any one of a C1 to C20 alkyl group, a C1 to C20 alkoxy group, a C2 to C20 alkoxyalkyl group, a C6 to C20 aryl group, a C7 to C20 arylalkyl group, and a C7 to C20 alkylaryl group.

For example, the first transition metal compound may be represented by the following Chemical Formula 1a.

[Chemical Formula 1a]
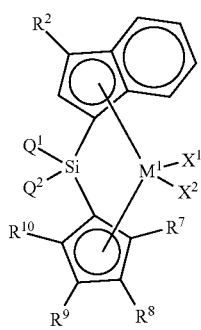
In Chemical Formula 1a, $M^1$, $X^1$, $X^2$, $R^2$, $R^7$, $R^8$, $R^9$, $R^{10}$, $Q^1$, and $Q^2$ may be the same as those described in Chemical Formula 1.
In the supported hybrid catalyst of the present disclosure, the first transition metal compound may be any one of compounds represented by the following structural formulae.
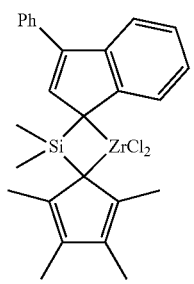 , 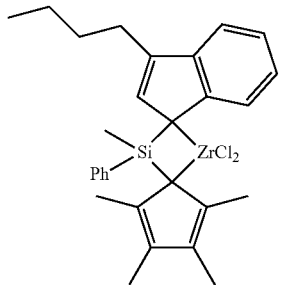 ,
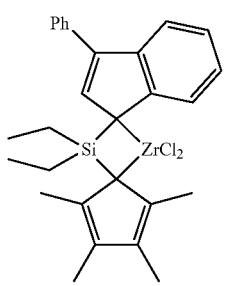 ,
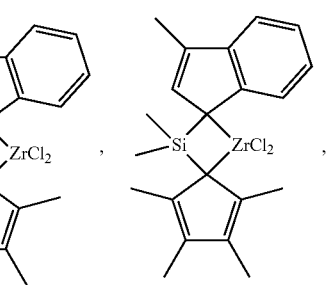 , 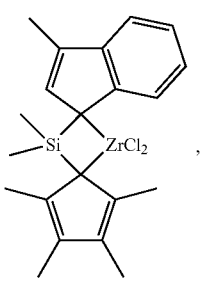 ,
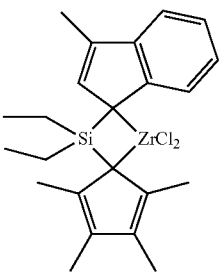 , 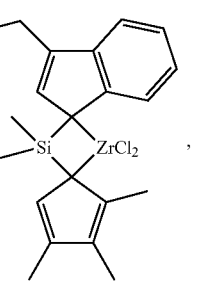 ,
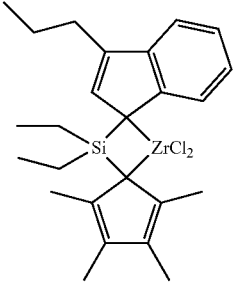 , 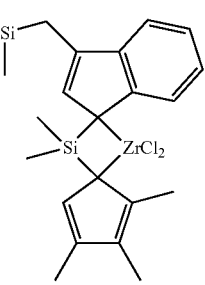 ,
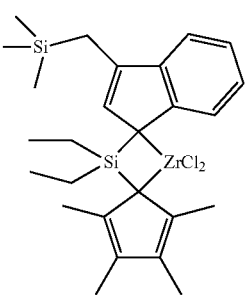 ,
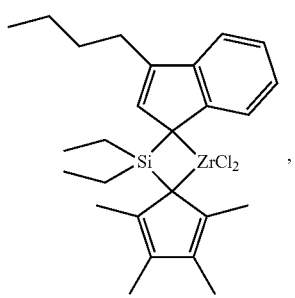 , 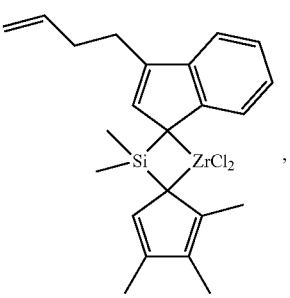 ,

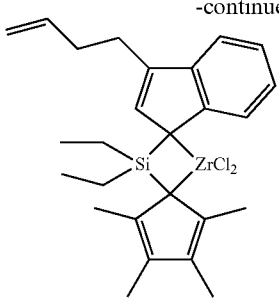

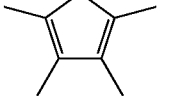
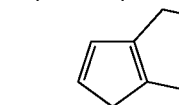
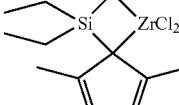
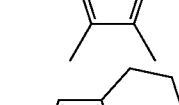
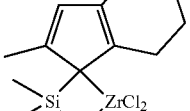

On the other hand, in the second transition metal compound of Chemical Formula 2, $M^2$ may be Ti, Zr, or Hf; X3 and X4 are the same as or different from each other, and may each independently be any one of a halogen, a C1 to C20 alkyl group, and a C1 to C20 alkoxy group; $R^{11}$ and $R^{12}$ are the same as or different from each other, and may each independently be any one of hydrogen, a C1 to C20 alkyl group, a C1 to C20 alkoxy group, and a C2 to C20 alkenyl group; $R^{13}$ to $R^{20}$ may each independently be any one of hydrogen, a C1 to C20 alkyl group, a C1 to C20 alkoxy group, and a C2 to C20 alkenyl group, or one or more pairs of neighboring substituents of $R^{13}$ to $R^{20}$ may be connected with each other to form a substituted or unsubstituted aliphatic ring; $R^{21}$ to $R^{24}$ are the same as or different from each other, and may each independently be any one of a C1 to C20 alkyl group, a C1 to C20 alkoxy group, and a C2 to C20 alkenyl group; and Q3 and Q4 may each independently be any one of a C1 to C20 alkyl group, a C1 to C20 alkoxy group, a C2 to C20 alkoxyalkyl group, a C6 to C20 aryl group, a C7 to C20 arylalkyl group, and a C7 to C20 alkylaryl group.

For example, the second transition metal compound may be represented by the following Chemical Formula 2a.

[Chemical Formula 2a]

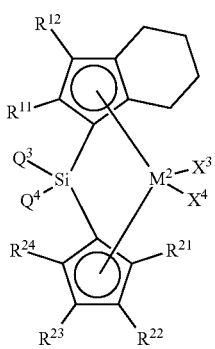

In Chemical Formula 2a, $M^2$, $X^3$, $X^4$, $R^{11}$, $R^{12}$, $R^{21}$, $R^{22}$, $R^{23}$, $R^{24}$, $Q^3$, and $Q^4$ may be the same as those described in Chemical Formula 2.

In the supported hybrid catalyst of the present disclosure, the second transition metal compound may be any one of compounds represented by the following structural formulae.

In addition, the first transition metal compound and the second transition metal compound may be contained in a molar mixing ratio of 1:1 to 1:15.

The support may include any one or a mixture of two or more selected from the group consisting of silica, alumina, and magnesia.

The supported hybrid catalyst of the present disclosure may further include at least one cocatalyst selected from the group consisting of compounds represented by the following Chemical Formulae 3 to 5.

$$R^{26}-[Al(R^{25})-O]_n-R^{27}$$ [Chemical Formula 3]

In Chemical Formula 3,
$R^{25}$, $R^{26}$, and $R^{27}$ are each independently any one of hydrogen, a halogen, a C1 to C20 hydrocarbyl group, and a halogen-substituted C1 to C20 hydrocarbyl group; and
n is an integer of 2 or more.

$$D(R^{28})_3$$ [Chemical Formula 4]

In Chemical Formula 4,
D is aluminum or boron; and
$R^{28}$ are each independently any one of a halogen, a C1 to C20 hydrocarbyl group, a C1 to C20 hydrocarbyloxy group, and a halogen-substituted C1 to C20 hydrocarbyl group.

$$[L-H]^+[W(A)_4]^- \text{ or } [L]^+[W(A)_4]^-$$ [Chemical Formula 5]

In Chemical Formula 5,
L is a neutral or cationic Lewis base; H is a hydrogen atom;
W is a Group 13 element; and
A are each independently any one of a C1 to C20 hydrocarbyl group, a C1 to C20 hydrocarbyloxy group, and a substituent in which at least one hydrogen atom of these substituents is substituted with at least one selected from a halogen, a C1 to C20 hydrocarbyloxy group, and a C1 to C20 hydrocarbyl(oxy)silyl group.

On the other hand, according to another embodiment of the present disclosure, a method for preparing a polyolefin, including the step of polymerizing olefinic monomers in the presence of the supported hybrid catalyst, is provided.

For example, the olefinic monomer may include at least one selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, and 3-chloromethylstyrene.

On the other hand, according to another embodiment of the present disclosure, a polyolefin prepared by the method is provided. The polyolefin may have melt strength of 90 mN or more, and haze of 20% or less as measured in accordance with ISO 14728 at 50 μm in thickness.

For example, the polyolefin may be an ethylene-1-hexene copolymer.

Effects of the Invention

The supported hybrid catalyst according to the present disclosure can easily prepare a polyolefin maintaining high transparent haze and having improved melt strength to enhance bubble stability and exhibit excellent processability for a blown film.

This polyolefin exhibits high processability and is expected to be applied as a raw material for various products. In particular, the polyolefin can stably prepare a film by a melt blown process, and is expected to be usefully applied as a raw material for products prepared by a melt blown process.

DETAILED DESCRIPTION OF THE EMBODIMENTS

In the present disclosure, the terms "first", "second", and the like are used to describe a variety of components, and these terms are merely employed to distinguish a certain component from other components.

Also, the terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present disclosure will be described in detail.

According to an embodiment of the present disclosure, a supported hybrid catalyst including at least one first transition metal compound selected from compounds represented by the following Chemical Formula 1; at least one second transition metal compound selected from compounds represented by the following Chemical Formula 2; and a support on which the first and the second transition metal compounds are supported, is provided.

[Chemical Formula 1]

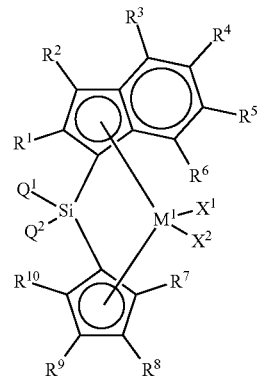

In Chemical Formula 1, $M^1$ is a Group 4 transition metal;

$X^1$ and $X^2$ are the same as or different from each other, and are each independently any one of a halogen, a nitro group, an amido group, a phosphine group, a phosphide group, a C1 to C30 hydrocarbyl group, a C1 to C30 hydrocarbyloxy group, a C2 to C30 hydrocarbyloxyhydrocarbyl group, —SiH$_3$, a C1 to C30 hydrocarbyl(oxy)silyl group, a C1 to C30 sulfonate group, and a C1 to C30 sulfone group;

$R^1$ and $R^3$ to $R^{10}$ are the same as or different from each other, and are each independently selected from the group consisting of hydrogen, a C1 to C30 hydrocarbyl group, a C1 to C30 hydrocarbyloxy group, and a C2 to C30 hydrocarbyloxyhydrocarbyl group;

$R^2$ is selected from the group consisting of a C1 to C30 hydrocarbyl group, a C1 to C30 hydrocarbyloxy group, and a C2 to C30 hydrocarbyloxyhydrocarbyl group;

$Q^1$ and $Q^2$ are the same as or different from each other, and are each independently any one of hydrogen, a C1 to C30 hydrocarbyl group, a C1 to C30 hydrocarbyloxy group, a C2 to C30 hydrocarbyloxyhydrocarbyl group, —SiH$_3$, a C1 to C30 hydrocarbyl(oxy)silyl group, a C1 to C30 hydrocarbyl group substituted with a halogen, and —NR$_a$R$_b$; and $R_a$ and $R_b$ are the same as or different from each other, and are each independently any one of hydrogen and a C1 to C30 hydrocarbyl group, or may be connected with each other to form an aliphatic or aromatic ring.

[Chemical Formula 2]

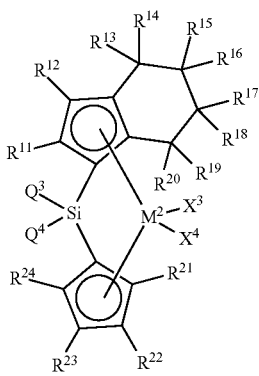

In Chemical Formula 2, $M^2$ is a Group 4 transition metal;

$X^3$ and $X^4$ are the same as or different from each other, and are each independently any one of a halogen, a nitro group, an amido group, a phosphine group, a phosphide group, a C1 to C30 hydrocarbyl group, a C1 to C30 hydrocarbyloxy group, a C2 to C30 hydrocarbyloxyhydrocarbyl group, —SiH$_3$, a C1 to C30 hydrocarbyl(oxy)silyl group, a C1 to C30 sulfonate group, and a C1 to C30 sulfone group;

$R^{11}$ to $R^{24}$ are the same as or different from each other, and are each independently selected from the group consisting of hydrogen, a C1 to C30 hydrocarbyl group, a C1 to C30 hydrocarbyloxy group, and a C2 to C30 hydrocarbyloxyhydrocarbyl group;

$Q^3$ and $Q^4$ are the same as or different from each other, and are each independently any one of hydrogen, a C1 to C30 hydrocarbyl group, a C1 to C30 hydrocarbyloxy group, a C2 to C30 hydrocarbyloxyhydrocarbyl group, —SiH$_3$, a C1 to C30 hydrocarbyl(oxy)silyl group, a C1 to C30 hydrocarbyl group substituted with a halogen, and —NR$_a$'R$_b$'; and R$_a$' and R$_b$' are the same as or different from each other, and are each independently any one of hydrogen and a C1 to C30 hydrocarbyl group, or may be connected with each other to form an aliphatic or aromatic ring.

Unless otherwise specified herein, the following terms may be defined as follows.

The hydrocarbyl group is a monovalent functional group in a hydrogen-removed form from a hydrocarbon, and may include an alkyl group, an alkenyl group, an alkynyl group, an aryl group, an aralkyl group, an aralkenyl group, an aralkynyl group, an alkylaryl group, an alkenylaryl group, an alkynylaryl group, and the like. The C1 to C30 hydrocarbyl group may be a C1 to C20 or C1 to C10 hydrocarbyl group. Specifically, the C1 to C30 hydrocarbyl group may be a linear, branched, or cyclic alkyl group such as a methyl group, an ethyl group, an n-propyl group, an iso-propyl group, an n-butyl group, an iso-butyl group, a tert-butyl group, an n-pentyl group, an n-hexyl group, an n-heptyl group, and a cyclohexyl group; or an aryl group such as a phenyl group, a naphthyl group, and an anthracenyl group.

The hydrocarbyloxy group is a functional group in which the hydrocarbyl group is bonded to oxygen. Specifically, the C1 to C30 hydrocarbyloxy group may be a C1 to C20 or C1 to C10 hydrocarbyloxy group. More specifically, the C1 to C30 hydrocarbyloxy group may be a linear, branched, or cyclic alkoxy group such as a methoxy group, an ethoxy group, an n-propoxy group, an iso-propoxy group, an n-butoxy group, an iso-butoxy group, a tert-butoxy group, an n-pentoxy group, an n-hexyloxy group, an n-heptoxy group, and a cyclohexyloxy group; or an aryloxy group such as a phenoxy group and a naphthalenoxy group.

The hydrocarbyloxyhydrocarbyl group is a functional group in which at least one hydrogen of the hydrocarbyl group is substituted with at least one hydrocarbyloxy group. Specifically, the C2 to C30 hydrocarbyloxyhydrocarbyl group may be a C2 to C20 or C2 to C15 hydrocarbyloxyhydrocarbyl group. More specifically, the C2 to C30 hydrocarbyloxyhydrocarbyl group may be an alkoxyalkyl group such as a methoxymethyl group, a methoxyethyl group, an ethoxymethyl group, an iso-propoxymethyl group, an iso-propoxyethyl group, an iso-propoxyhexyl group, a tert-butoxymethyl group, a tert-butoxyethyl group, and a tert-butoxyhexyl group; or an aryloxyalkyl group such as a phenoxyhexyl group.

The hydrocarbyl(oxy)silyl group is a functional group in which one to three hydrogens of —SiH$_3$ are substituted with one to three hydrocarbyl or hydrocarbyloxy groups. Specifically, the C1 to C30 hydrocarbyl(oxy)silyl group may be a C1 to C20, C1 to C15, C1 to C10, or C1 to C5 hydrocarbyl(oxy)silyl group. More specifically, the C1 to C30 hydrocarbyl(oxy)silyl group may be an alkylsilyl group such as a methylsilyl group, a dimethylsilyl group, a trimethylsilyl group, a dimethylethylsilyl group, a diethylmethylsilyl group, and a dimethylpropylsilyl group; an alkoxysilyl group such as a methoxysilyl group, a dimethoxysilyl group, a trimethoxysilyl group, and a dimethoxyethoxysilyl group; or an alkoxyalkylsilyl group such as a methoxydimethylsilyl group, a diethoxymethylsilyl group, and a dimethoxypropylsilyl group.

The C1 to C20 silylhydrocarbyl group is a functional group in which at least one hydrogen atom of the hydrocarbyl group is substituted with a silyl group. The silyl group may be —SiH$_3$ or a hydrocarbyl(oxy)silyl group. Specifically, the C1 to C20 silylhydrocarbyl group may be a C1 to C15 or C1 to C10 silylhydrocarbyl group. More specifically, the C1 to C20 silylhydrocarbyl group may be —CH$_2$—SiH$_3$, a methylsilylmethyl group, a dimethylethoxysilylpropyl group, or the like.

The halogen may be fluorine (F), chlorine (Cl), bromine (Br), or iodine (I). The sulfonate group has a structure of —O—SO$_2$—R$^a$, and R$^a$ may be a C1 to C30 hydrocarbyl group. Specifically, the C1 to C30 sulfonate group may be a methanesulfonate group, a phenylsulfonate group, or the like.

The C1 to C30 sulfone group has a structure of —R$^{c'}$—SO$_2$—R$^{c''}$, and R$^{c'}$ and R$^{c''}$ may be the same as or different from each other, and may each independently be any one of a C1 to C30 hydrocarbyl group. Specifically, the C1 to C30 sulfone group may be a methylsulfonylmethyl group, a methylsulfonylpropyl group, a methylsulfonylbutyl group, a phenylsulfonylpropyl group, or the like.

In this disclosure, "two neighboring substituents are connected with each other to form an aliphatic or aromatic ring" means that the atom(s) of two substituents and the atom(s) to which the two substituents are bonded are connected with each other to form a ring. Specifically, examples in which R$_a$ and R$_b$ or R$_{a'}$ and R$_{b'}$, of —NR$_a$R$_b$ or —NR$_{a'}$R$_{b'}$ are connected with each other to form an aliphatic ring include a piperidinyl group, and examples in which R$_a$ and R$_b$ or R$_{a'}$ and R$_{b'}$, of —NR$_a$R$_b$ or —NR$_{a'}$R$_{b'}$ are connected with each other to form an aromatic ring include a pyrrolyl group.

The above-mentioned substituents may optionally be substituted with one or more substituents selected from the group consisting of a hydroxyl group; a halogen; a hydrocarbyl group; a hydrocarbyloxy group; a hydrocarbyl group or a hydrocarbyloxy group containing at least one heteroatom of Group 14 to 16 heteroatoms; a silyl group; a hydrocarbyl(oxy)silyl group; a phosphine group; a phosphide group; a sulfonate group; and a sulfone group.

Conventionally, polyolefins prepared using a catalyst with one kind of transition metal compound exhibited poor bubble stability. As a result, it has been difficult to stably form a film when the polyolefin prepared using a catalyst having one kind of transition metal compound is processed by a melt blown process or the like. In addition, even when the bubble stability is improved, there is a problem that a highly transparent film can not be obtained because transparency (haze) deteriorates.

However, when the supported hybrid catalyst according to the embodiment of the present disclosure is used, melt strength, which is one of important properties for determining the bubble stability of polyolefins, is strengthened, so that a polyolefin having high processability, particularly excellent processability for a blown film, can be obtained. In addition, the supported hybrid catalyst can improve the processability for a blown film while maintaining high transparent haze.

Specifically, in the supported hybrid catalyst according to the embodiment of the present disclosure, the first transition metal compound can easily prepare a polyolefin containing long chain branches and having a low molecular weight. Further, the second transition metal compound can easily prepare a polyolefin containing a smaller amount of long chain branches and having a relatively high molecular weight compared to the first transition metal compound. In particular, when the polymer has a large amount of long chain branches and a high molecular weight, the melt strength is increased. In the case of the first transition metal compound, there is a limit in improving the bubble stability because the molecular weight is low as compared with many long chain branches. On the other hand, in the case of mLLDPE containing long chain branches polymerized by a metallocene catalyst, it is difficult to simultaneously improve the transparency and the melt strength because the transparency is deteriorated when the molecular weight is high.

In the present disclosure, the first transition metal compound that prepares a polymer having a relatively large amount of long chain branches and a low molecular weight, and the second transition metal compound that prepares a polymer having a relatively small amount of long chain branches and a high molecular weight, are hybrid-supported to maintain excellent transparency while improving the melt strength. As the long chain branches present in the polymer are located on the relatively low molecular weight side by hybrid-supporting the two transition metal compounds, the transparency does not deteriorate.

In particular, the supported hybrid catalyst of the present disclosure is characterized in that the long chain branches formed by the first transition metal compound of Chemical Formula 1 and the long chain branches formed by the second transition metal compound of Chemical Formula 2 are entangled at the molecular level. Because of the entanglement between the long chain branches, a large force is required to be released in the molten state, so that the melt strength is strengthened. As the improvement of melt strength is not significant when homopolymers of each catalyst are melt-blended, it is effective to improve the melt strength when entanglement occurs from a polymerization stage by the supported hybrid catalyst.

More specifically, in the supported hybrid catalyst according to the embodiment of the present disclosure, the first transition metal compound represented by Chemical Formula 1 includes a cyclopentadienyl ligand and an indenyl ligand having a substituent other than hydrogen at the 3-position as different ligands, and the different ligands are cross-linked by —Si($Q^1$)($Q^2$)- and have a structure in which $M^2(X^1)(X^2)$ exists between the different ligands. When the transition metal compound having such a specific structure is activated by an appropriate method and used as a catalyst in the polymerization of olefins, it is possible to prepare long chain branches.

Specifically, the cyclopentadienyl ligand in the structure of the transition metal compound represented by Chemical Formula 1 may affect, for example, the activity of olefin polymerization.

Specifically, when $R^7$ to $R^{10}$ of the cyclopentadienyl ligand are each independently any one of a C1 to C20 alkyl group, a C1 to C20 alkoxy group, and a C2 to C20 alkenyl group, the catalyst obtained from the transition metal compound of Chemical Formula 1 may exhibit higher activity in the olefin polymerization process. Further, when $R^7$ to $R^{10}$ are each independently any one of a methyl group, an ethyl group, a propyl group, and a butyl group, the supported hybrid catalyst may exhibit very high activity in the polymerization process of olefinic monomers.

In addition, the indenyl ligand in the structure of the transition metal compound represented by Chemical Formula 1 can easily control, for example, the molecular weight of the prepared polyolefin by adjusting the degree of steric hindrance effect depending on the type of the substituted functional groups.

Specifically, $R^1$ and $R^3$ to $R^{10}$ may each independently be any one of hydrogen, a C1 to C20 alkyl group, a C1 to C20 alkoxy group, a C2 to C20 alkoxyalkyl group, a C1 to C20 alkylsilyl group, a C1 to C20 silylalkyl group, a C1 to C20 alkoxysilyl group, a C1 to C20 silyloxyalkyl group, a C2 to C20 alkenyl group, a C6 to C20 aryl group, a C7 to C20 alkylaryl group, and a C7 to C20 arylalkyl group.

In addition, $R^2$ may be any one of a C1 to C20 alkyl group, a C1 to C20 alkoxy group, a C2 to C20 alkoxyalkyl group, a C1 to C20 alkylsilyl group, a C1 to C20 silylalkyl group, a C1 to C20 alkoxysilyl group, a C1 to C20 silyloxyalkyl group, a C2 to C20 alkenyl group, a C6 to C20 aryl group, a C7 to C20 alkylaryl group, and a C7 to C20 arylalkyl group.

In particular, in order to provide a polyolefin having better processability, $R^1$ and $R^3$ to $R^6$ of Chemical Formula 1 may be hydrogen, and $R^2$ may be any one of a C1 to C20 alkyl group, a C1 to C20 alkoxy group, a C2 to C20 alkenyl group, a C6 to C20 aryl group, a C7 to C20 arylalkyl group, and a C7 to C20 alkylaryl group, and more specifically, a C1 to C20 alkyl group or a C6 to C20 aryl group. Also, considering remarkable effects of improving the processability in accordance with the type and position of the substituents, $R^2$ may be a C6 to C20 aryl group, and more specifically, a phenyl group.

In addition, the cyclopentadienyl ligand and indenyl ligand are cross-linked by —Si($Q^1$)($Q^2$)- to exhibit excellent stability. In order to effectively ensure this effect, a transition metal compound in which $Q^1$ and $Q^2$ are each independently any one of a C1 to C20 alkyl group, a C1 to C20 alkoxy group, and a C2 to C20 alkoxyalkyl group can be used. More specifically, a transition metal compound in which $Q^1$ and $Q^2$ are the same as each other and any one of a methyl group, an ethyl group, a propyl group, a butyl group, a phenyl group, and a benzyl group can be used.

Meanwhile, $M^2(X^1)(X^2)$ presents between the cross-linked cyclopentadienyl ligand and the indenyl ligand, and $M^2(X^1)(X^2)$ may affect storage stability of the metal complex. In order to effectively ensure this effect, $X^1$ and $X^2$ may each independently be any one of a halogen, a C1 to C20 alkyl group, and a C1 to C20 alkoxy group. More specifically, $X^1$ and $X^2$ may each independently be F, Cl, Br, or I, and $M^1$ may be Ti, Zr, or Hf; Zr or Hf; or Zr.

As the first transition metal compound having the increased melt strength and capable of providing a polyolefin having excellent processability for a blown film, the compound of Chemical Formula 1 may be a compound represented by the following structural formulae, but is not limited thereto.

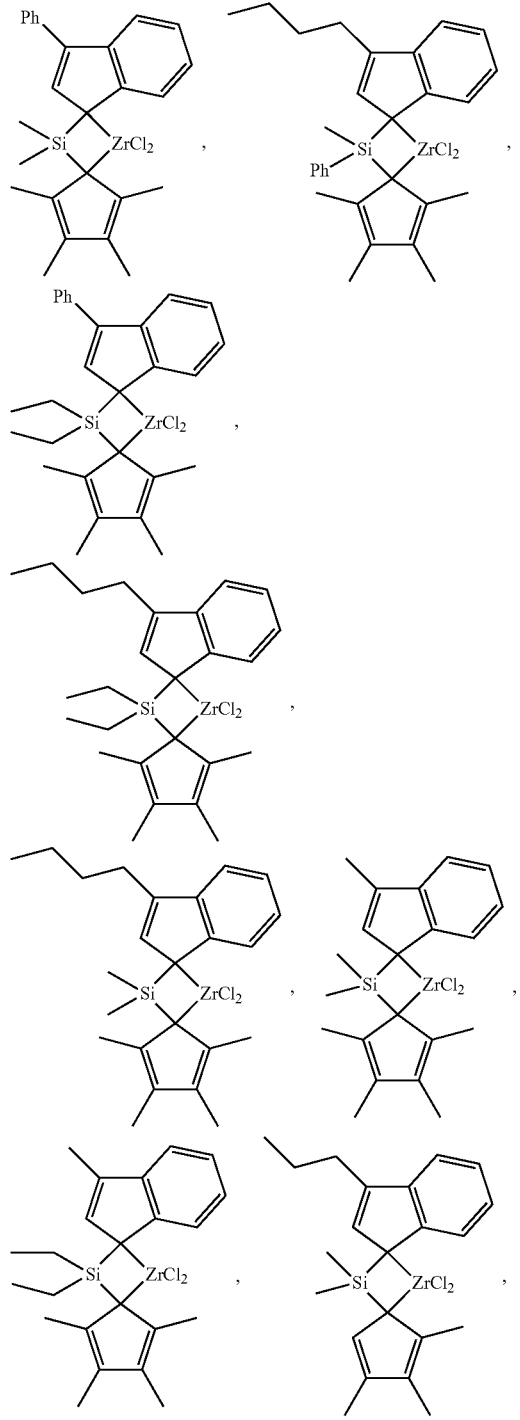

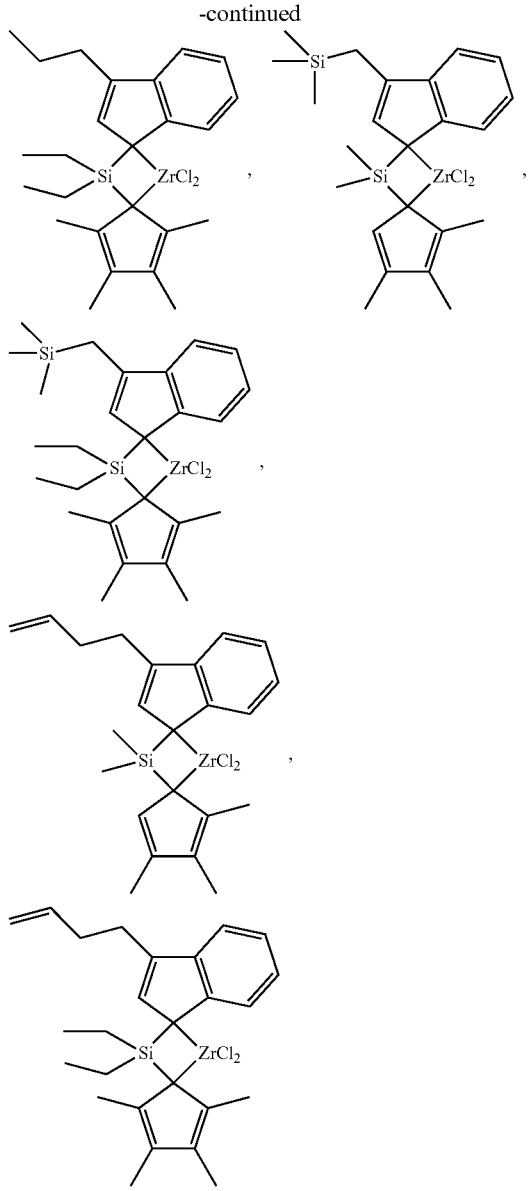

The first transition metal compound represented by Chemical Formula 1 may be synthesized by applying known reactions. Specifically, an indene derivative and a cyclopentadiene derivative are linked with a bridge compound to prepare a ligand compound, and then metalation is performed by adding a metal precursor compound. However, the present disclosure is not limited thereto, and the synthesis method can be referred to in the examples.

Meanwhile, in the supported hybrid catalyst according to the embodiment of the present disclosure, the transition metal compound represented by Chemical Formula 2 includes a cyclopentadienyl ligand and a tetrahydroindenyl ligand as different ligands, and the different ligand are cross-linked by —Si($Q^1$)($Q^2$)- and have a structure in which $M^2(X^3)(X^4)$ exists between the different ligands. A polymer having a small amount of long chain branches and a relatively narrow molecular weight distribution (PDI, MWD, Mw/Mn) and melt flow rate (MFRR) can be obtained by polymerizing using a catalyst having the structure.

Specifically, the cyclopentadienyl ligand in the structure of the transition metal compound represented by Chemical Formula 2 may affect, for example, the olefin polymerization activity.

Particularly, $R^{21}$ to $R^{24}$ of the cyclopentadienyl ligand may each independently be any one of a C1 to C20 alkyl group, a C1 to C20 alkoxy group, and a C2 to C20 alkenyl group. Alternatively, $R^{21}$ to $R^{24}$ may each independently be any one of a methyl group, an ethyl group, a propyl group, and a butyl group.

In addition, in the structure of the transition metal compound represented by Chemical Formula 2, the tetrahydroindenyl ligand structure can exhibit stable and high polymerization activity by having a pair of non-covalent electrons capable of acting as a Lewis base. Further, the tetrahydroindenyl ligand can easily control, for example, the molecular weight of the prepared polyolefin by adjusting the degree of steric hindrance effect depending on the type of the substituted functional groups.

Specifically, $R^{11}$ and $R^{12}$ of Chemical Formula 2 may each independently be any one of hydrogen, a C1 to C20 alkyl group, a C1 to C20 alkoxy group, and a C2 to C20 alkenyl group, $R^{13}$ to $R^{20}$ may each independently be any one of hydrogen, a C1 to C20 alkyl group, a C1 to C20 alkoxy group, and a C2 to C20 alkenyl group, or one or more pairs of neighboring substituents of $R^{13}$ to $R^{20}$ may be connected with each other to form a substituted or unsubstituted aliphatic ring. More specifically, $R^{11}$ and $R^{12}$ of Chemical Formula 2 may each independently be any one of hydrogen, a C1 to C4 alkyl group, a C1 to C4 alkoxy group, and a C2 to C4 alkenyl group, $R^{13}$ to $R^{20}$ may each independently be any one of hydrogen, a C1 to C4 alkyl group, a C1 to C4 alkoxy group, and a C2 to C4 alkenyl group, or one or more pairs of neighboring substituents of $R^{13}$ to $R^{20}$ may be connected with each other to form a substituted or unsubstituted aliphatic ring. In this case, the supported hybrid catalyst can prepare a polyolefin having excellent processability.

In addition, in the structure of the transition metal compound represented by Chemical Formula 2, the cyclopentadienyl ligand and tetrahydroindenyl ligand are cross-linked by —Si($Q^3$)($Q^4$)- to exhibit excellent stability. In order to effectively ensure this effect, a transition metal compound in which $Q^3$ and $Q^4$ are each independently any one of a C1 to C20 alkyl group, a C1 to C20 alkoxy group, and a C2 to C20 alkoxyalkyl group can be used. More specifically, a transition metal compound in which $Q^3$ and $Q^4$ are the same as each other and any one of a methyl group, an ethyl group, a propyl group, a butyl group, a phenyl group, and a benzyl group can be used.

In the structure of the transition metal compound represented by Chemical Formula 2, $M^2(X^3)(X^4)$ presents between the cyclopentadienyl ligand, and the tetrahydroindenyl ligand may affect storage stability of the metal complex. In order to effectively ensure this effect, $X^3$ and $X^4$ may each independently be any one of a halogen, a C1 to C20 alkyl group, and a C1 to C20 alkoxy group. More specifically, $X^3$ and $X^4$ may each independently be F, Cl, Br, or I, and $M^2$ may be Ti, Zr, or Hf; Zr or Hf; or Zr.

As the second transition metal compound having the increased melt strength and capable of providing a polyolefin having excellent processability for a blown film, the compound of Chemical Formula 2 may be a compound represented by the following structural formulae, but is not limited thereto.

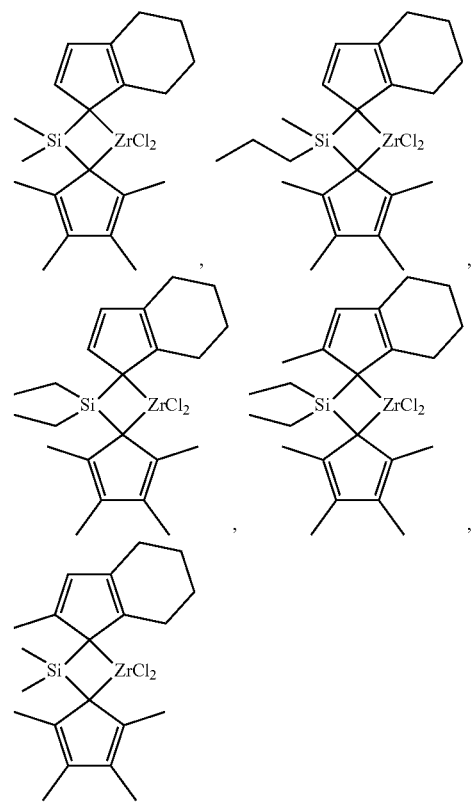

The second transition metal compound represented by Chemical Formula 2 may be synthesized by applying known reactions. Specifically, an indenyl derivative and a cyclopentadiene derivative are linked with a bridge compound to prepare a ligand compound, and then metalation is performed by adding a metal precursor compound, followed by a hydrogenation reaction to prepare a metal compound having a tetrahydroindenyl derivative. However, the present disclosure is not limited thereto, and the synthesis method can be referred to in the examples.

Meanwhile, the first and second transition metal compounds have the above-described structural characteristics and can be stably supported on a support.

As the support, those containing hydroxyl groups or siloxane groups on the surface may be used. Specifically, supports containing hydroxyl groups or siloxane groups having high reactivity by removing moisture on the surface by drying at a high temperature may be used. More specifically, silica, alumina, magnesia, or a mixture thereof may be used, and the silica is more preferable. The support may be dried at a high temperature, and may commonly contain oxides, carbonates, sulfates, and nitrates such as $K_2CO_3$, $BaSO_4$, $Mg(NO_3)_2$, and the like.

The drying temperature of the support may preferably be 200 to 800° C., more preferably 300 to 600° C., and most preferably 300 to 400° C. If the drying temperature of the support is less than 200° C., surface moisture may react with the cocatalyst due to excessive moisture. If it is greater than 800° C., pores on the surface of the support may be combined to reduce the surface area, and a lot of hydroxyl groups may be lost on the surface and only siloxane groups may remain, thus decreasing the reaction sites with the cocatalyst, which is not preferable.

The amount of the hydroxyl groups on the surface of the support may preferably be 0.1 to 10 mmol/g, and more preferably 0.5 to 5 mmol/g. The amount of the hydroxyl groups on the surface of the support may be controlled by the preparation method and conditions of the support, or drying conditions, for example, temperature, time, vacuum degree, spray drying, or the like.

If the amount of the hydroxyl groups are less than 0.1 mmol/g, the reaction sites with the cocatalyst may be few, and if it is greater than 10 mmol/g, there is a possibility of being derived from moisture rather than hydroxyl groups on the surface of the support particle, which is not preferable.

In addition, the supported hybrid catalyst according to the embodiment of the present disclosure may further include a cocatalyst to activate the transition metal compound, which is a catalyst precursor. The cocatalyst is an organometallic compound containing a Group 13 metal, and is not particularly limited as long as it can be used in the polymerization of olefins in the presence of a general metallocene catalyst. Specifically, the cocatalyst may be at least one compound selected from the group consisting of compounds represented by the following Chemical Formulae 3 to 5.

$$R^{26}-[Al(R^{25})-O]_n-R^{27} \quad \text{[Chemical Formula 3]}$$

In Chemical Formula 3, $R^{25}$, $R^{26}$, and $R^{27}$ are each independently any one of hydrogen, a halogen, a C1 to C20 hydrocarbyl group, and a halogen-substituted C1 to C20 hydrocarbyl group; and n is an integer of 2 or more.

$$D(R^{28})_3 \quad \text{[Chemical Formula 4]}$$

In Chemical Formula 4,

D is aluminum or boron; and $R^{28}$ are each independently any one of a halogen, a C1 to C20 hydrocarbyl group, a C1 to C20 hydrocarbyloxy group, and a halogen-substituted C1 to C20 hydrocarbyl group.

$$[L-H]^+[W(A)_4]^- \text{ or } [L]^+[W(A)_4]^- \quad \text{[Chemical Formula 5]}$$

In Chemical Formula 5,

L is a neutral or cationic Lewis base; H is a hydrogen atom;

W is a Group 13 element; and

A are each independently any one of a C1 to C20 hydrocarbyl group, a C1 to C20 hydrocarbyloxy group, and a substituent in which at least one hydrogen atom of these substituents is substituted with at least one selected from a halogen, a C1 to C20 hydrocarbyloxy group, and a C1 to C20 hydrocarbyl(oxy)silyl group.

Examples of the compound represented by Chemical Formula 3 may include methylaluminoxane, ethylaluminoxane, iso-butylaluminoxane, tert-butylaluminoxane, and the like. Examples of the compound represented by Chemical Formula 4 may include trimethylaluminum, triethylaluminum, triisobutylaluminum, tripropylaluminum, tributylaluminum, dimethylchloroaluminum, triisopropylaluminum, tri-sec-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminummethoxide, and the like. Lastly, examples of the compound represented by Chemical Formula 5 may include trimethylammonium tetrakis(pentafluorophenyl) borate, triethylammonium tetrakis(pentafluorophenyl) borate, N,N-dimethylanilinium tetrakis(pentafluorophenyl) borate, N,N-dimethylanilinium n-butyltris(pentafluorophenyl) borate, N,N-dimethylanilinium benzyltris(pentafluorophenyl) borate, N,N-dimethylanilinium tetrakis(4-(t-butyldimethylsilyl)-2,3,5,6-tetrafluorophenyl) borate, N,N-dimethylanilinium tetrakis(4-(triisopropylsilyl)-2,3,5,6-tetrafluorophenyl) borate, N,N-dimethylanilinium pentafluorophenoxy tris(pentafluorophenyl) borate, N,N-dimethyl-2,4,6-trimethylanilinium tetrakis(pentafluorophenyl) borate, timethylammonium tetrakis(2,3,4,6-tetrafluorophenyl) borate, N,N-dimethylanilinium tetrakis(2,3,4,6-tetrafluorophenyl) borate, hexadecyldimethylammonium tetrakis(pentafluorophenyl) borate, N-methyl-N-dodecyl anilinium tetrakis(pentafluorophenyl) borate, methyldi(dodecyl) ammonium tetrakis(pentafluorophenyl) borate, and the like.

The supported hybrid catalyst may be prepared by using a method including the steps of: supporting a cocatalyst on a support, and supporting the first and second transition metal compounds, which are catalyst precursors, on the cocatalyst-supported support.

Specifically, in the step of supporting a cocatalyst on a support, a cocatalyst-supported support may be prepared by adding the cocatalyst to the support dried at a high temperature and stirring the same at a temperature of about 20 to 120° C.

Further, in the step of supporting the catalyst precursors on the cocatalyst-supported support, a supported catalyst may be prepared by adding the transition metal compounds to the cocatalyst-supported support prepared in the step of supporting a cocatalyst on a support, and stirring the same at a temperature of about 20 to 120° C.

In the step of supporting the catalyst precursors on the cocatalyst-supported support, a supported catalyst may be prepared by adding the transition metal compounds to the cocatalyst-supported support and stirring the same, followed by adding the additional cocatalyst.

The content of the support, cocatalyst, cocatalyst-supported support, and transition metal compounds used in the supported hybrid catalyst according to the embodiment of the present disclosure can be appropriately adjusted depending on physical properties or effects of the desired supported catalyst.

Specifically, in the supported hybrid catalyst according to the embodiment of the present disclosure, a molar mixing ratio of the first transition metal compound and the second transition metal compound may be 1:1 to 1:15, more specifically 1:4 to 1:10. By including the first and second transition metal compounds within the above-described molar mixing ratio, the length and number of long chain branches can be controlled to improve the melt strength without increasing the molecular weight distribution, and thereby a polyolefin having excellent bubble stability and processability for a blown film can be more easily manufactured.

In the supported hybrid catalyst according to the embodiment of the present disclosure, a weight ratio of the total transition metal compounds including the first and second transition metal compounds to the support may be 1:10 to 1:1,000, more specifically 1:10 to 1:500. When the support and the transition metal compounds are contained within the above-mentioned weight ratio, an optimal shape can be obtained.

When the supported hybrid catalyst further includes a cocatalyst, a weight ratio of the cocatalyst to the support may be 1:1 to 1:100, more specifically from 1:1 to 1:50. When the cocatalyst and the support are contained within the weight ratio, activity and polymer microstructure can be optimized.

As the reaction solvent in the preparation of the supported hybrid catalyst, a hydrocarbon solvent such as pentane, hexane, heptane, or the like, or an aromatic solvent such as benzene, toluene, or the like, may be used.

As a specific method for preparing the supported catalyst, the following examples can be referred to. However, the preparation method of the supported catalyst is not limited to this description. The preparation method may further include a step which is usually carried out in the technical field of the present invention, and the step(s) of the preparation method may be changed by the step(s) that are usually changeable.

According to another embodiment of the present disclosure, a method for preparing a polyolefin, including the step of polymerizing olefinic monomers in the presence of the supported hybrid metallocene catalyst, is provided.

As described above, due to the specific structure of the supported hybrid catalyst, a polyolefin having excellent bubble stability and processability for a blown film compared with the polyolefin polymerized using the conventional transition metal compound catalyst can be manufactured by improving the melt strength without increasing the molecular weight distribution.

Specific examples of the olefinic monomer which can be polymerized using the supported hybrid catalyst may include ethylene, alpha-olefin, cyclic olefin, and a diene-based or triene-based olefinic monomer having at least two double bonds. The olefinic monomer may be ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene, or the like, and these monomers may be copolymerized by mixing two or more thereof. When the polyolefin is a copolymer of ethylene and another comonomer, the comonomer is preferably at least one comonomer selected from the group consisting of propylene, 1-butene, 1-hexene, 4-methyl-1-pentene, and 1-octene.

The polymerization of the olefinic monomers may be carried out by various polymerization processes known for polymerization of olefinic monomers such as a continuous solution polymerization process, a bulk polymerization process, a suspension polymerization process, a slurry polymerization process, or an emulsion polymerization process.

The polymerization reaction may be carried out at a temperature of about 50 to 110° C., or about 60 to 100° C., and a pressure of about 1 to 100 kgf/cm$^2$, or about 1 to 50 kgf/cm$^2$.

In the polymerization reaction, the supported hybrid catalyst may be used in a state of being dissolved or diluted in a solvent such as pentane, hexane, heptane, nonane, decane, toluene, benzene, dichloromethane, chlorobenzene, and the like. At this time, by treating the solvent with a small amount of alkylaluminum or the like, a small amount of water or air which can adversely affect the catalyst can be removed in advance.

The polyolefin prepared by the above-described method exhibits high melt strength without increasing the molecular weight distribution due to the use of the supported hybrid catalyst, and as a result, it can exhibit excellent bubble stability and processability for a blown film.

Specifically, the polyolefin may have a molecular weight distribution (MWD) of 2.5 to 4.0, more specifically 2.8 to 3.7, and even more specifically 3.0 to 3.7. Also, the polyolefin may have melt strength of 90 mN or higher, or 90 mN to 200 mN, and more specifically 95 mN to 150 mN. In addition, the polyolefin may have haze of 20% or less, or 1% to 20%, more specifically 1% to 17%, or 1% to 15%, as measured in accordance with ISO 14728 at 50 μm (micrometers) in thickness, which refers to a good haze characteristic.

In addition, the polyolefin may not only have the above-described molecular weight distribution and melt strength, but also a weight average molecular weight of 10,000 g/mol to 5,000,000 g/mol, and more specifically 50,000 g/mol to 200,000 g/mol.

The polyolefin may have a melt index (MI) of 0.8 g/10 min to 1.5 g/10 min, more specifically 0.85 g/10 min to 1.4 g/10 min, as measured in accordance with ASTM D1238 at 190° C. under a load of 2.16 kg. The polyolefin may also have a melt flow rate (MFRR, 21.6/2.16) of 30 to 90, more specifically 30 to 50, which is determined by dividing a melt flow rate (MFR$_{21.6}$) measured in accordance with ISO 1133 at 190° C. under a load of 21.6 kg by a melt flow rate (MFR$_{2.16}$) measured in accordance with ISO 1133 at 190° C. under a load of 2.16 kg.

In addition, when the polymer to be polymerized using the supported hybrid catalyst is an ethylene-alpha olefin copolymer, preferably an ethylene-1-hexene copolymer, the above-mentioned physical properties can be more suitably satisfied.

Hereinafter, preferred examples will be described in order to facilitate understanding of the present invention. However, these examples are provided to facilitate understanding of the present invention, and the invention is not intended to be limited thereto.

EXAMPLES

Synthesis Examples of Metallocene Compounds

Synthesis Example 1: The First Transition Metal Compound

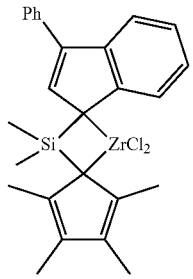

Tetramethylcyclopentadiene (TMCP) was filtered after lithiation with n-BuLi (1 eq.) in tetrahydrofuran (THF, 0.4 M), and used as TMCP-Li salts. 3-phenylIndene (3-Ph-Ind) was filtered after lithiation with n-BuLi (1 eq.), and used as 3-Ph-Ind-Li salts. 50 mmol of TMCP-Li salts and 100 mL of THF were added to a 250 mL Schlenk flask under Ar. 1 eq. of (CH$_3$)$_2$SiCl$_2$ was added thereto at −20° C. After 6 hours, 3 mol % of CuCN and 3-Ph-Ind-Li salts (50 mmol, MTBE 1M solution) were added at −20° C. and reacted for 12 hours. An organic layer was separated with water and hexane to obtain a ligand.

The synthesized ligand (50 mmol) was dissolved in 100 mL of methyl tert-butyl ether (MTBE) under Ar, and 2 eq.

of n-BuLi was added dropwise at −20° C. After 16 hours of reaction, a ligand-Li solution was added to ZrCl$_4$(THF)$_2$ (50 mmol, MTBE 1 M solution). After 16 hours of reaction, the solvent was removed, and the residue was dissolved in methylene chloride (MC) to remove LiCl. The solvent of the filtrate was removed, 80 mL of MTBE was added thereto, and then stirred for 2 hours, followed by filtration to obtain a solid catalyst precursor (yield 40%).

$^1$H NMR (500 MHz, C$_6$D$_6$): 0.78 (3H, s), 0.97 (3H, s), 1.64 (3H, s), 1.84 (3H, s), 1.88 (6H, 2s), 5.91 (1H, s), 6.89 (1H, t), 7.19 (1H, t), 7.25 (1H, t), 7.30 (2H, t), 7.37 (1H, d), 7.74 (2H, d), 7.93 (1H, d).

Synthesis Example 2: The First Transition Metal Compound

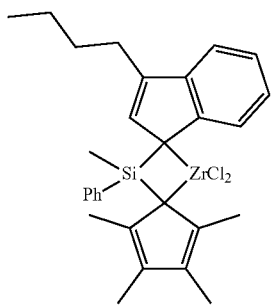

Tetramethylcyclopentadiene (TMCP) was filtered after lithiation with n-BuLi (1 eq.) in tetrahydrofuran (THF, 0.4 M), and used as TMCP-Li salts. 50 mmol of TMCP-Li salts and 100 mL of THF were added to a 250 mL Schlenk flask under Ar. 1 eq. of CH$_3$PhSiCl$_2$ was added thereto at −20° C. 50 mmol of 3-butylindene (3-Bulnd) and 100 mL of THF were added to another 250 mL Schlenk flask under Ar, and 1 eq. of n-BuLi was added dropwise at −20° C. After 16 hours, 3 mol % of CuCN was added to a lithiated 3-Bulnd solution, and stirred for 30 minutes. This solution was added to the first flask at −20° C., and reacted for 12 hours. An organic layer was separated with water and hexane to obtain a ligand. The synthesized ligand (50 mmol) was dissolved in 100 mL of MTBE under Ar, and 2 eq. of n-BuLi was added dropwise at −20° C. After 16 hours of reaction, a ligand-Li solution was added to ZrCl$_4$(THF)$_2$ (50 mmol, MTBE 1 M solution). After 16 hours of reaction, the solvent was removed, and the residue was dissolved in methylene chloride (MC) to remove LiCl. The solvent of the filtrate was removed, 50 mL of MTBE and 100 mL of hexane were added thereto, and then stirred for 2 hours, followed by filtration to obtain a solid catalyst precursor.

$^1$H NMR (500 MHz, CDCl$_3$): 0.93 and 0.88 (3H, 2t), 1.26 and 1.02 (3H, 2s), 1.46 and 1.55 (3H, 2s), 1.44-1.51 (2H, m), 1.55-1.60 (2H, m), 1.89 and 1.92 (3H, 2s), 1.98 and 2.03 (3H, 2s), 2.01 and 2.05 (3H, 2s), 2.52 and 2.86 (1H, 2m), 2.92-2.98 (1H, m), 5.65 (1H, s), 7.23 (1H, m), 6.87 and 7.38 (1H, 2t), 7.30-7.48 (1H, 2t), 7.59 and 7.63 (1H, 2d), 7.52-7.58 (3H, m), 7.96-8.03 (2H, dd).

Synthesis Example 3: The First Transition Metal Compound

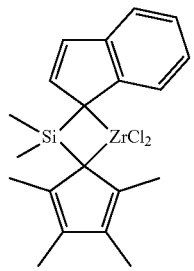

Tetramethylcyclopentadiene (TMCP) was filtered after lithiation with n-BuLi (1 eq.) in tetrahydrofuran (THF, 0.4 M), and used as TMCP-Li salts. Indene was filtered after lithiation with n-BuLi (1 eq.) in hexane (0.5 M), and used as Ind-Li salts. 50 mmol of TMCP-Li salts and 100 mL of THF were added to a 250 mL Schlenk flask under Ar. 1 eq. of (CH$_3$)$_2$SiCl$_2$ was added thereto at −20° C. After 6 hours, 3 mol % of CuCN and Ind-Li salts (50 mmol, MTBE 1M solution) were added at −20° C. and reacted for 12 hours. An organic layer was separated with water and hexane to obtain a ligand.

The synthesized ligand (50 mmol) was dissolved in 100 mL of MTBE under Ar, and 2 eq. of n-BuLi was added dropwise at −20° C. After 16 hours of reaction, a ligand-Li solution was added to ZrCl$_4$(THF)$_2$ (50 mmol, MTBE 1 M solution). After 16 hours of reaction, the solvent was removed, and the residue was dissolved in methylene chloride (MC) to remove LiCl. The solvent of the filtrate was removed, 20 mL of toluene and 100 mL of MTBE were added thereto, and then stirred for 2 hours, followed by filtration to obtain a solid catalyst precursor.

$^1$H NMR (500 MHz, CDCl$_3$): 0.96 (3H, s), 1.16 (3H, s), 1.91 (3H, s), 1.93 (3H, s), 1.96 (3H, s), 1.97 (3H, s), 5.98 (1H, d), 7.07 (1H, t), 7.23 (1H, d), 7.35 (1H, t), 7.49 (1H, d), 7.70 (1H, d).

Synthesis Example 4: The Second Transition Metal Compound

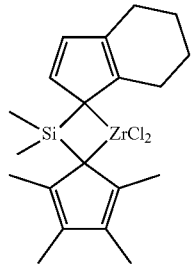

20 mmol of the transition metal compound of Synthesis Example 3, 60 mmol of dichloromethane (DCM), and 5 mol % of a Pd/C catalyst were added to a high-pressure stainless steel (SUS) reactor under an argon atmosphere. The argon inside the reactor was displaced three times with hydrogen and charged with hydrogen to a pressure of 20 bar. The reaction was completed by stirring at 35° C. for 24 hours. After replacing the inside with argon, the DCM solution was transported to a Schlenk flask under an argon atmosphere. The solution was passed through a Celite filter under argon to remove the Pd/C catalyst, and the solvent was dried to obtain a solid catalyst precursor.

$^1$H NMR (500 MHz, CDCl$_3$): 0.82 (3H, s), 0.88 (3H, s), 1.92 (6H, s), 1.99 (3H, s), 2.05 (3H, s), 2.34 (2H, m), 2.54 (2H, m), 2.68 (2H, m), 3.03 (2H, m), 5.45 (1H, s), 6.67 (1H, s).

Synthesis Example 5: The Second Transition Metal Compound

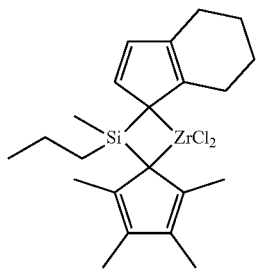

Tetramethylcyclopentadiene (TMCP) was filtered after lithiation with n-BuLi (1 eq.) in tetrahydrofuran (THF, 0.4 M), and used as TMCP-Li salts. Indene was filtered after lithiation with n-BuLi (1 eq.) in hexane (0.5 M), and used as Ind-Li salts. 50 mmol of TMCP-Li salts and 100 mL of THF were added to a 250 mL Schlenk flask under Ar. 1 eq. of dichloromethylpropyl silane was added thereto at −20° C. After 6 hours, 3 mol % of CuCN and Ind-Li salts (50 mmol, MTBE 1M solution) were added at −20° C. and reacted for 12 hours. An organic layer was separated with water and hexane to obtain a ligand.

The synthesized ligand (50 mmol) was dissolved in 100 mL of MTBE under Ar, and 2 eq. of n-BuLi was added dropwise at −20° C. After 16 hours of reaction, a ligand-Li solution was added to ZrCl$_4$(THF)$_2$ (50 mmol, MTBE 1 M solution). After 16 hours of reaction, the solvent was removed, and the residue was dissolved in methylene chloride (MC) to remove LiCl. The solvent of the filtrate was removed, 50 mL of MTBE and 100 mL of hexane were added thereto, and then stirred for 2 hours, followed by filtration to obtain a solid metallocene catalyst precursor.

20 mmol of the metallocene catalyst precursor obtained above, 60 mmol of DCM, and 5 mol % of a Pd/C catalyst were added to a high-pressure stainless steel (SUS) reactor under an argon atmosphere. The argon inside the reactor was displaced three times with hydrogen and charged with hydrogen to a pressure of 20 bar. The reaction was completed by stirring at 35° C. for 24 hours. After replacing the inside with argon, the DCM solution was transported to a Schlenk flask under an argon atmosphere. The solution was passed through a Celite filter under argon to remove the Pd/C catalyst, and the solvent was dried to obtain a solid catalyst precursor.

$^1$H NMR (500 MHz, CDCl$_3$): 0.80 (3H, s), 0.86 (3H, s), 1.12 (2H, m), 1.32 (2H, m), 1.41 (2H, s), 1.54 (2H, m), 1.65 (2H, m), 1.84 (2H, m), 1.91 (6H, d), 1.93 (3H, s), 1.99 (3H, s), 2.25 (2H, m), 2.37 (2H, m), 2.54 (2H, m), 2.99 (2H, m), 5.45 (1H, s), 6.67 (1H, s).

Preparation Examples of Metallocene Compound-Supported Catalysts

Preparation Example 1: Preparation of Supported Hybrid Catalyst (1) Preparation of a Support Silica (SP 952, manufactured by Grace Davision) was dehydrated and dried at a temperature of 600° C. under vacuum for 12 hours.

(2) Preparation of a Cocatalyst-Supported Support 20 g of the dried silica was placed in a glass reactor and a methylaluminoxane (MAO) solution containing aluminum in an amount of 13 mmol in a toluene solution was added thereto, followed by slow reaction at 40° C. for 1 hour. After completion of the reaction, the reaction product was washed several times with a sufficient amount of toluene until the unreacted aluminum compound was completely removed, and the remaining toluene was removed at 50° C. under reduced pressure. As a result, 32 g of a cocatalyst-supported support (MAO/SiO$_2$) was obtained (Al content in the supported catalyst=17 wt %).

(3) Preparation of Supported Hybrid Catalyst 12 g of the cocatalyst-supported support (MAO/SiO$_2$) obtained above was placed in a glass reactor, and 70 ml of toluene was added thereto and stirred. A solution prepared by dissolving the compound (0.20 mmol) prepared in Synthesis Example 1 as a first transition metal compound and the compound (1.00 mmol) prepared in Synthesis Example 4 in toluene was added to the glass reactor, and the solution was stirred at 40° C. for 2 hours. Thereafter, the reaction product was washed with a sufficient amount of toluene and then vacuum-dried to obtain a supported hybrid catalyst in a solid powder. At this time, the molar mixing ratio of the first transition metal compound and the second transition metal compound was 1:5.

Preparation Example 2: Preparation of Supported Hybrid Catalyst

A supported hybrid catalyst was prepared in the same manner as in Preparation Example 1, except that the transition metal compounds prepared in Synthesis Example 1 (0.20 mmol) and Synthesis Example 5 (1.00 mmol) were used.

Preparation Example 3: Preparation of Supported Hybrid Catalyst

A supported hybrid catalyst was prepared in the same manner as in Preparation Example 1, except that the transition metal compounds prepared in Synthesis Example 2 (0.17 mmol) and Synthesis Example 4 (1.03 mmol) were used.

Preparation Example 4: Preparation of Supported Hybrid Catalyst

A supported hybrid catalyst was prepared in the same manner as in Preparation Example 1, except that the transition metal compounds prepared in Synthesis Example 2 (0.17 mmol) and Synthesis Example 5 (1.03 mmol) were used.

Comparative Preparation Example 1: Preparation of Supported Catalyst

A supported catalyst was prepared in the same manner as in Preparation Example 1, except that the transition metal compound prepared in Synthesis Example 1 (1.2 mmol) was used alone.

Comparative Preparation Example 2: Preparation of Supported Catalyst

A supported catalyst was prepared in the same manner as in Preparation Example 1, except that the transition metal compound prepared in Synthesis Example 5 (1.2 mmol) was used alone.

Comparative Preparation Example 1: Preparation of Supported Hybrid Catalyst

A supported hybrid catalyst was prepared in the same manner as in Preparation Example 1, except that the transition metal compounds prepared in Synthesis Example 3 (0.20 mmol) and Synthesis Example 4 (1.00 mmol) were used.

Examples of Preparation of Polyolefins

Example 1: Preparation of a Polyolefin

The supported hybrid catalyst (90 mg) prepared above was quantified in a dry box, placed in a 50 mL glass bottle, sealed with a rubber septum, and then taken out from the dry box to prepare a catalyst to be injected. The polymerization was carried out in a temperature controlled 2 L autoclave high pressure reactor equipped with a mechanical stirrer.

2 mL of triethylaluminum (1M in Hexane) was added to the reactor, 0.6 kg of hexane was added thereto, and the temperature was raised to 80° C. while stirring at 500 rpm. The supported hybrid catalyst (90 mg) prepared above and hexane (20 mL) were charged into a vial to place them in the reactor, and 50 g of 1-hexene and 0.2 kg of hexane were added thereto. When the internal temperature of the reactor reached 80° C., 0.11 mol % of hydrogen ($H_2$) was added thereto, and the mixture was reacted for 1 hour while stirring at 500 rpm under an ethylene pressure of 30 bar. After the completion of the reaction, hexane of the obtained polymer was firstly removed through a filter. The polymer was then dried in an oven at 80° C. for 3 hours to obtain an ethylene-1-hexene copolymer.

Example 2: Preparation of a Polyolefin

An ethylene-1-hexene copolymer was prepared in the same manner as in Example 1, except that the supported hybrid catalyst prepared in Preparation Example 2 was used, as in Table 1.

Example 3: Preparation of a Polyolefin

An ethylene-1-hexene copolymer was prepared in the same manner as in Example 1, except that the supported hybrid catalyst prepared in Preparation Example 3 was used and the amount of hydrogen ($H_2$) was changed to 0.02 mol %, as in Table 1.

Example 4: Preparation of a Polyolefin

An ethylene-1-hexene copolymer was prepared in the same manner as in Example 1, except that the supported hybrid catalyst prepared in Preparation Example 4 was used and the amount of hydrogen ($H_2$) was changed to 0.02 mol %, as in Table 1.

Comparative Example 1: Preparation of a Polyolefin

An ethylene-1-hexene copolymer was prepared in the same manner as in Example 1, except that the supported catalyst prepared in Comparative Preparation Example 1 was used and the amount of hydrogen ($H_2$) was changed to 0.02 mol %, as in Table 1.

Comparative Example 2: Preparation of a Polyolefin

An ethylene-1-hexene copolymer was prepared in the same manner as in Example 1, except that the supported catalyst prepared in Comparative Preparation Example 2 was used and the amount of hydrogen ($H_2$) was changed to 0.12 mol %, as in Table 1.

Comparative Example 3: Preparation of a Polyolefin

An ethylene-1-hexene copolymer was prepared in the same manner as in Example 1, except that the supported catalyst prepared in Comparative Preparation Example 3 was used and the amount of hydrogen ($H_2$) was changed to 0.12 mol %, as in Table 1.

Comparative Example 4: Preparation of a Polyolefin

An ethylene-1-hexene copolymer was prepared in the same manner as in Example 1, except that the respective polymers prepared by using the single-supported catalysts prepared in Comparative Preparation Examples 1 and 2 respectively were melt-blended at a weight ratio of 1:5, as in Table 1.

The types and molar ratios or weight ratios of the catalysts used in Examples 1 to 4 and Comparative Examples 1 to 4 are shown in Table 1 below.

TABLE 1

| Catalyst | Ex. 1 Prep. Ex. 1 | Ex. 2 Prep. Ex. 2 | Ex. 3 Prep. Ex. 3 | Ex. 4 Prep. Ex. 4 | Comp. Ex. 1 Comp. Prep. Ex. 1 | Comp. Ex. 2 Comp. Prep. Ex. 2 | Comp. Ex. 3 Comp. Prep. Ex. 3 | Comp. Ex. 4 Comp. Prep. Ex. 1 Comp. Prep. Ex. 2 |
|---|---|---|---|---|---|---|---|---|
| Type of supported catalyst | Hybrid-supported | Hybrid-supported | Hybrid-supported | Hybrid-supported | Single-supported | Single-supported | Hybrid-supported | Single-supported |
| Composition of transition metal compounds | Syn. Ex. 1 Syn. Ex. 4 | Syn. Ex. 1 Syn. Ex. 5 | Syn. Ex. 2 Syn. Ex. 4 | Syn. Ex. 2 Syn. Ex. 5 | Syn. Ex. 1 | Syn. Ex. 5 | Syn. Ex. 3 Syn. Ex. 4 | Syn. Ex. 1 Syn. Ex. 5 |
| Ratio of transition metal compounds (molar ratio) | 1:5 | 1:5 | 1:6 | 1:6 | — | — | 1:5 | 1:5* |

*melt blending of the respective polymers prepared by using the single-supported catalysts (weight ratio of 1/5)

Experimental Examples

The activity of the catalysts used in Examples 1 to 4 and Comparative Examples 1 to 4 and the physical properties of polyolefins prepared using the catalysts are shown in Table 2 below.

(1) The activity of the catalyst (kgPE/gCat): The activity of the catalyst used in each of the examples and comparative examples was calculated by measuring the mass of the catalyst used in the synthesis reaction of the examples and comparative examples and the mass of the polymer produced from the reaction.

(2) Mw, Mz, Mz/Mw: 10 mg of the sample was dissolved in 1,2,4-trichlorobenzene containing 0.0125% of BHT at 160° C. for 10 hours by using PL-SP260, and MW (weight average molecular weight) and molecular weight distribution (PDI, MWD, Mw/Mn) were measured using PLGPC220 at 160° C.

(3) $MI_{2.16}$ and MFRR(21.6/2.16): The melt Index ($MI_{2.16}$) was measured according to ASTM D1238 (Condition E, 190° C., a load of 2.16 kg). The melt Flow Rate Ratio (MFRR, 21.6/2.16) was calculated by dividing $MFR_{21.6}$ by $MFR_{2.16}$, wherein $MFR_{21.6}$ was measured according to ISO 1133 at a temperature of 190° C. under a load of 21.6 kg, and $MFR_{2.16}$ was measured according to ISO 1133 at a temperature of 190° C. under a load of 2.16 kg.

(4) The melt strength (mN): The melt strength of the polyolefin was measured using Goettfert Rheotens 71.97 equipped with a model 3211 Instron capillary rheometer. The polyolefin melts were discharged through a capillary die (plane die, 180 degree angle) with a ratio (L/D) of length (L) to diameter (D) of 15. After equilibrating the sample at 190° C. for 5 minutes, the piston was moved at a rate of 1 inch/minute (2.54 cm/minute). The standard test temperature was 190° C. The sample was uniaxially pulled into a set of accelerating nips located 100 mm below the die at an acceleration of 12 mm/s². The tension was recorded as a function of the pulling speed of the nip roll. The following conditions were used for measuring the melt strength.

Plunger speed: 0.423 mm/s

Capillary die L/D: 15

Shear rate: 72/s

Initial speed of wheel: 18 mm/s

Acceleration of wheel: 12 mm/s²

Diameter of barrel: 9.52 mm (5) The haze (%): It was measured according to ISO 14728. At this time, the thickness of the specimen was set to 50 μm, and the average value was measured after 10 measurements per specimen.

TABLE 2

| | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| Activity (kgPE/gCat) | 4.1 | 4.7 | 5.3 | 5.6 | 5.3 | 2.9 | 3.2 | — |
| $MI_{2.16}$ | 0.85 | 0.92 | 1.23 | 1.40 | 1.80 | 0.40 | 0.90 | 0.72 |
| MFRR (21.6/2.16) | 48.1 | 47.8 | 35.1 | 34.2 | 46.3 | 33.4 | 37.2 | 35.6 |
| w (×10⁴ g/mol) | 12.1 | 11.9 | 11.0 | 10.6 | 8.7 | 13.7 | 12.0 | 12.5 |
| PDI | 3.7 | 3.5 | 3.3 | 3.2 | 3.5 | 3.1 | 3.7 | 3.2 |
| Melt strength* (mN) | 105 | 111 | 98 | 101 | 84 | 63 | 88 | 67 |
| Haze (%) | 13 | 11 | 13 | 12 | 16 | 12 | 17 | 12 | converted value of MI 0.8

As shown in Table 2, the polyolefins prepared using the supported hybrid catalysts of Examples 1 to 4 in which two or more kinds of transition metal compounds having a specific structure according to the present disclosure are supported exhibited remarkably increased melt strength while exhibiting a high transparent haze characteristic, as compared with the polyolefins of Comparative Examples 1, 2, and 4 prepared using the single-supported catalyst of one kind of transition metal compound and the polyolefin of Comparative Example 3 prepared using the supported hybrid catalyst in which the transition metal compounds without the specific structure are supported. From this, it can be confirmed that the polyolefins of Examples 1 to 5 have better bubble stability and processability for a blown film. More specifically, Example 2 exhibits an excellent haze characteristic as well as improved melt strength. In particular, in Example 2, the long chain branch is positioned on the low molecular weight side due to the hybrid-supporting of two catalysts, and the long chain branches generated from the respective catalysts are tangled with each other, thereby improving both the transparency and the melt strength.

However, with reference to the MFRR value, the catalyst used in Comparative Example 1 contains a large amount of long chain branches, so that the melt strength is excellent, but the transparency is poor. The catalyst used in Comparative Example 2 has a small amount of long chain branches, so that the melt strength is poor. In the case of Comparative Example 4 in which the polymers prepared by using the single-supported catalysts of Comparative Preparation Examples 1 and 2 were melt-blended, the transparency was kept about as high as Comparative Example 2, but the melt strength was not improved. From the results of Comparative Example 3, it can be seen that when the substituent is not present at the 3-position of the indenyl group of the first transition metal catalyst, the number of generated long chain branches is small, thereby lowering the melt strength compared with the case where the substituent is present.

The invention claimed is:

1. A supported hybrid catalyst, comprising at least one first transition metal compound selected from compounds represented by the following Chemical Formula 1;
at least one second transition metal compound selected from compounds represented by the following Chemical Formula 2; and
a support on which the first and second transition metal compounds are supported,

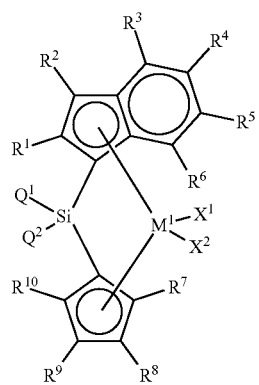

[Chemical Formula 1]

wherein, in Chemical Formula 1,
$M^1$ is a Group 4 transition metal;
$X^1$ and $X^2$ are the same as or different from each other, and are each independently any one of a halogen, a nitro group, an amido group, a phosphine group, a phosphide group, a C1 to C30 hydrocarbyl group, a C1 to C30 hydrocarbyloxy group, a C2 to C30 hydrocarbyloxyhydrocarbyl group, $-SiH_3$, a C1 to C30 hydrocarbyl(oxy)silyl group, a C1 to C30 sulfonate group, and a C1 to C30 sulfone group;
$R^1$ and $R^3$ to $R^{10}$ are the same as or different from each other, and are each independently selected from the group consisting of hydrogen, a C1 to C30 hydrocarbyl group, a C1 to C30 hydrocarbyloxy group, and a C2 to C30 hydrocarbyloxyhydrocarbyl group;
$R^2$ is selected from the group consisting of a C1 to C30 hydrocarbyl group, a C1 to C30 hydrocarbyloxy group, and a C2 to C30 hydrocarbyloxyhydrocarbyl group;
$Q^1$ and $Q^2$ are the same as or different from each other, and are each independently any one of hydrogen, a C1 to C30 hydrocarbyl group, a C1 to C30 hydrocarbyloxy group, a C2 to C30 hydrocarbyloxyhydrocarbyl group, $-SiH_3$, a C1 to C30 hydrocarbyl(oxy)silyl group, a C1 to C30 hydrocarbyl group substituted with a halogen, and $-NR_aR_b$; and
$R_a$ and $R_b$ are the same as or different from each other, and are each independently any one of hydrogen and a C1 to C30 hydrocarbyl group, or may be connected with each other to form an aliphatic or aromatic ring,

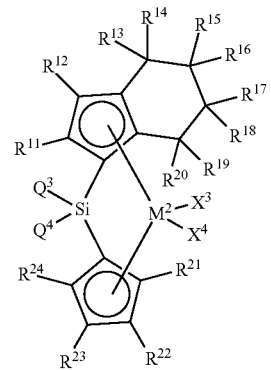

[Chemical Formula 2]

wherein, in Chemical Formula 2,
M2 is a Group 4 transition metal;
$X^3$ and $X^4$ are the same as or different from each other, and are each independently any one of a halogen, a nitro group, an amido group, a phosphine group, a phosphide group, a C1 to C30 hydrocarbyl group, a C1 to C30 hydrocarbyloxy group, a C2 to C30 hydrocarbyloxyhydrocarbyl group, $-SiH_3$, a C1 to C30 hydrocarbyl(oxy)silyl group, a C1 to C30 sulfonate group, and a C1 to C30 sulfone group;
$R^{11}$ to $R^{24}$ are the same as or different from each other, and are each independently selected from the group consisting of hydrogen, a C1 to C30 hydrocarbyl group, a C1 to C30 hydrocarbyloxy group, and a C2 to C30 hydrocarbyloxyhydrocarbyl group;
$Q^3$ and $Q^4$ are the same as or different from each other, and are each independently any one of hydrogen, a C1 to C30 hydrocarbyl group, a C1 to C30 hydrocarbyloxy group, a C2 to C30 hydrocarbyloxyhydrocarbyl group, $-SiH_3$, a C1 to C30 hydrocarbyl(oxy)silyl group, a C1 to C30 hydrocarbyl group substituted with a halogen, and $-NR_aR_b$; and
$R_{a'}$ and $R_{b'}$ are the same as or different from each other, and are each independently any one of hydrogen and a C1 to C30 hydrocarbyl group, or may be connected with each other to form an aliphatic or aromatic ring.

2. The supported hybrid catalyst of claim 1, wherein $R^1$ and $R^3$ to $R^6$ are each hydrogen, and $R^2$ each are any one of a C1 to C20 alkyl group, a C1 to C20 alkoxy group, a C2 to C20 alkenyl group, a C6 to C20 aryl group, a C7 to C20 arylalkyl group, and a C7 to C20 alkylaryl group.

3. The supported hybrid catalyst of claim 1, wherein $M^1$ is Ti, Zr, or Hf, $X^1$ and $X^2$ are the same as or different from each other, and are each independently any one of a halogen, a C1 to C20 alkyl group, and a C1 to C20 alkoxy group, $R^1$ and $R^3$ to $R^6$ are each hydrogen, $R^2$ is a C1 to C20 alkyl group, or a C6 to C20 aryl group, $R^7$ to $R^{10}$ are the same as or different from each other, and are each independently any one of a C1 to C20 alkyl group, a C1 to C20 alkoxy group, and a C2 to C20 alkenyl group, and $Q^1$ and $Q^2$ are each independently any one of a C1 to C20 alkyl group, a C1 to C20 alkoxy group, a C2 to C20 alkoxyalkyl group, a C6 to C20 aryl group, a C7 to C20 arylalkyl group, and a C7 to C20 alkylaryl group.

4. The supported hybrid catalyst of claim 1, wherein the first transition metal compound is any one of compounds represented by the following structural formulae:

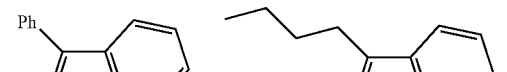

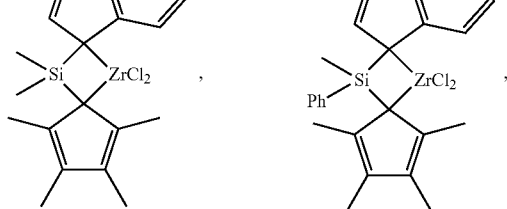

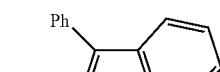

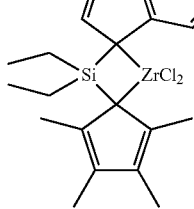

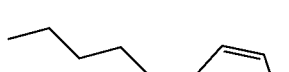

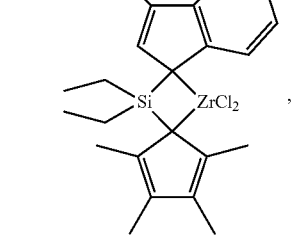

-continued

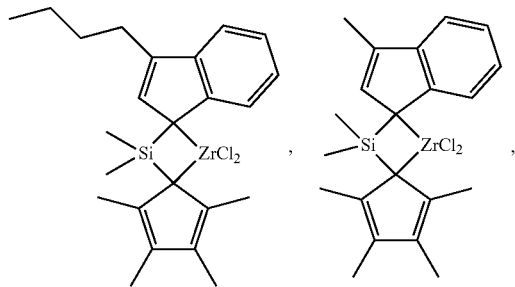

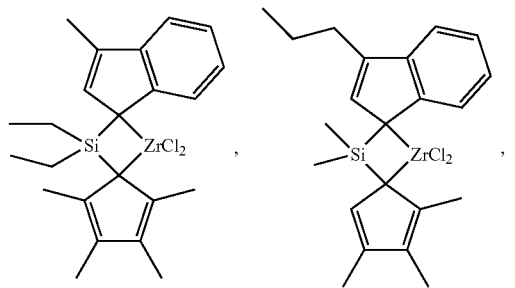

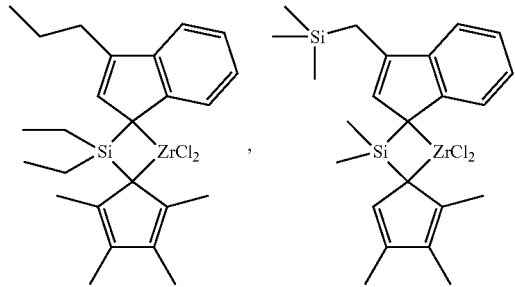

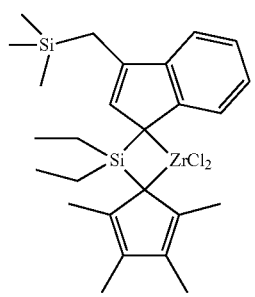

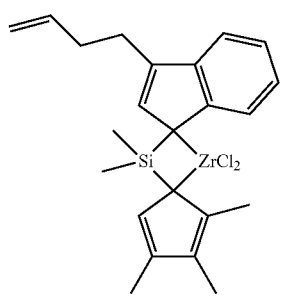

-continued

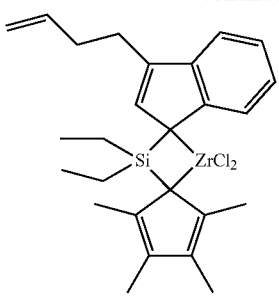

5. The supported hybrid catalyst of claim 1,
wherein $M^2$ is Ti, Zr, or Hf, $X^3$ and $X^4$ are the same as or different from each other, and are each independently any one of a halogen, a C1 to C20 alkyl group, and a C1 to C20 alkoxy group, $R^{11}$ and $R^{12}$ are the same as or different from each other, and are each independently any one of hydrogen, a C1 to C20 alkyl group, a C1 to C20 alkoxy group, and a C2 to C20 alkenyl group, $R^{13}$ to $R^{20}$ are each independently any one of hydrogen, a C1 to C20 alkyl group, a C1 to C20 alkoxy group, and a C2 to C20 alkenyl group, or one or more pairs of neighboring substituents of $R^{13}$ to $R^{20}$ may be connected with each other to form a substituted or unsubstituted aliphatic ring, $R^{21}$ to $R^{24}$ are the same as or different from each other, and are each independently any one of a C1 to C20 alkyl group, a C1 to C20 alkoxy group, and a C2 to C20 alkenyl group, and $Q^3$ and $Q^4$ are each independently any one of a C1 to C20 alkyl group, a C1 to C20 alkoxy group, a C2 to C20 alkoxyalkyl group, a C6 to C20 aryl group, a C7 to C20 arylalkyl group, and a C7 to C20 alkylaryl group.

6. The supported hybrid catalyst of claim 1, wherein the second transition metal compound is any one of compounds represented by the following structural formulae:

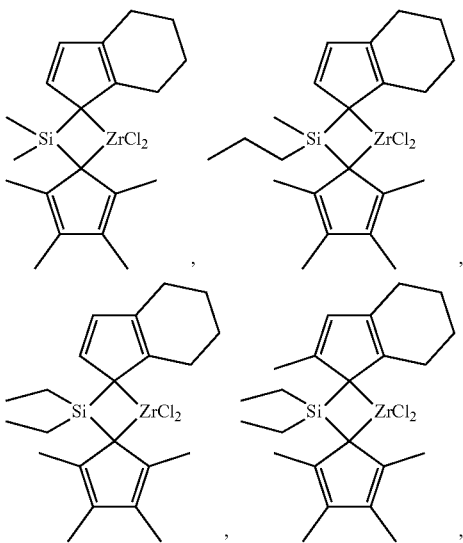

-continued

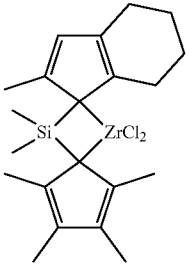

7. The supported hybrid catalyst of claim 1, wherein the first transition metal compound and the second transition metal compound are contained in a molar mixing ratio of 1:1 to 1:15.

8. The supported hybrid catalyst of claim 1, wherein the support comprises any one or a mixture of two or more selected from the group consisting of silica, alumina, and magnesia.

9. The supported hybrid catalyst of claim 1, further comprising at least one cocatalyst selected from the group consisting of compounds represented by the following Chemical Formulae 3 to 5:

$$R^{26}-[Al(R^{25})-O]_n-R^{27} \quad \text{[Chemical Formula 3]}$$

wherein, in Chemical Formula 3,
$R^{25}$, $R^{26}$, and $R^{27}$ are each independently any one of hydrogen, a halogen, a C1 to C20 hydrocarbyl group, and a halogen-substituted C1 to C20 hydrocarbyl group; and
n is an integer of 2 or more, $$D(R^{28})_3 \quad \text{[Chemical Formula 4]}$$

wherein, in Chemical Formula 4,
D is aluminum or boron; and
$R^{28}$ are each independently any one of a halogen, a C1 to C20 hydrocarbyl group, a C1 to C20 hydrocarbyloxy group, and a halogen-substituted C1 to C20 hydrocarbyl group;

$$[L-H]^+[W(A)_4]^- \text{ or } [L]^+[W(A)_4]^- \quad \text{[Chemical Formula 5]}$$

wherein, in Chemical Formula 5,
L is a neutral or cationic Lewis base; H is a hydrogen atom;
W is a Group 13 element; and
A are each independently any one of a C1 to C20 hydrocarbyl group; a C1 to C20 hydrocarbyloxy group; and a substituent in which at least one hydrogen atom of these substituents is substituted with at least one selected from a halogen, a C1 to C20 hydrocarbyloxy group, and a C1 to C20 hydrocarbyl(oxy)silyl group.

10. A method for preparing a polyolefin, comprising the step of polymerizing olefinic monomers in the presence of the supported hybrid catalyst of claim 1.

11. The method for preparing a polyolefin of claim 10, wherein the olefinic monomer comprises at least one selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5- pentadiene, 1,6-hexadiene, styrene, alpha-methylstyrene, divinylbenzene, and 3-chloromethylstyrene.

\* \* \* \* \*